No. 741,753. PATENTED OCT. 20, 1903.
A. M. ACKLIN.
HANDLING GLASS BATCH.
APPLICATION FILED OCT. 27, 1902.
NO MODEL. 3 SHEETS—SHEET 1.
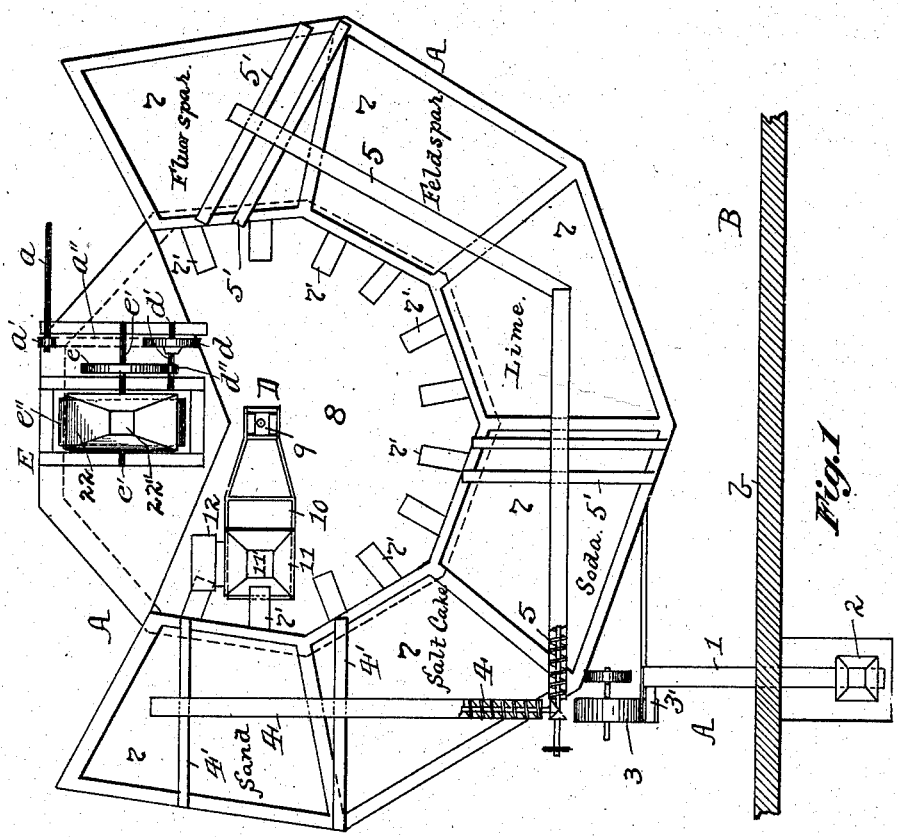

No. 741,753. PATENTED OCT. 20, 1903.
A. M. ACKLIN.
HANDLING GLASS BATCH.
APPLICATION FILED OCT. 27, 1902.
NO MODEL. 3 SHEETS—SHEET 2.
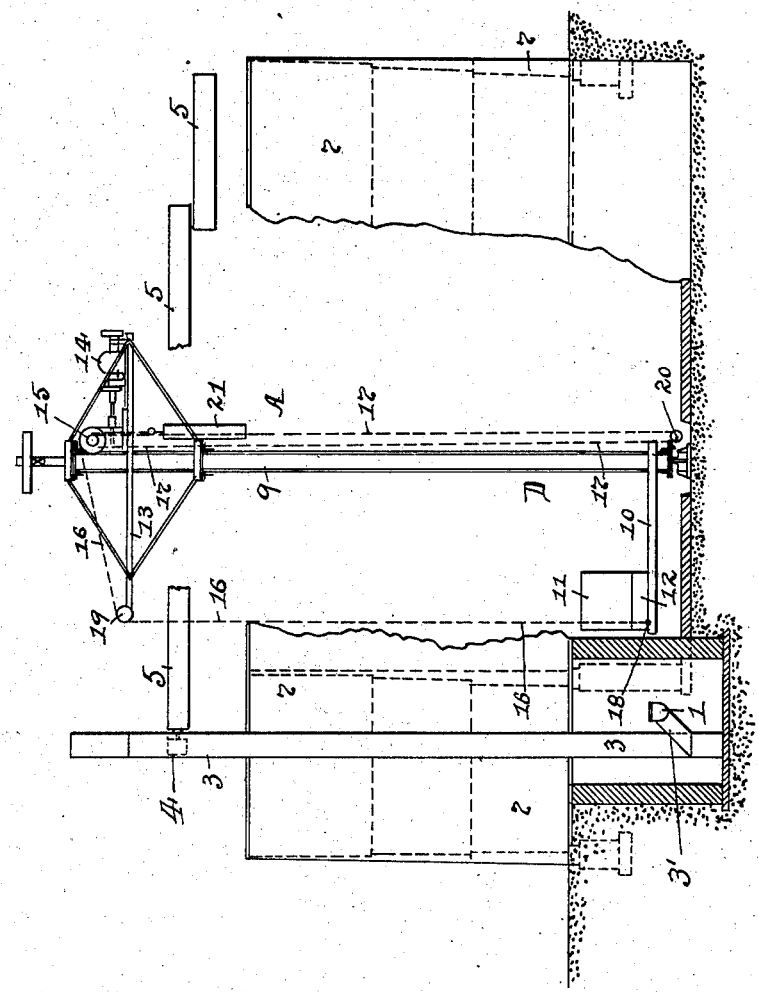

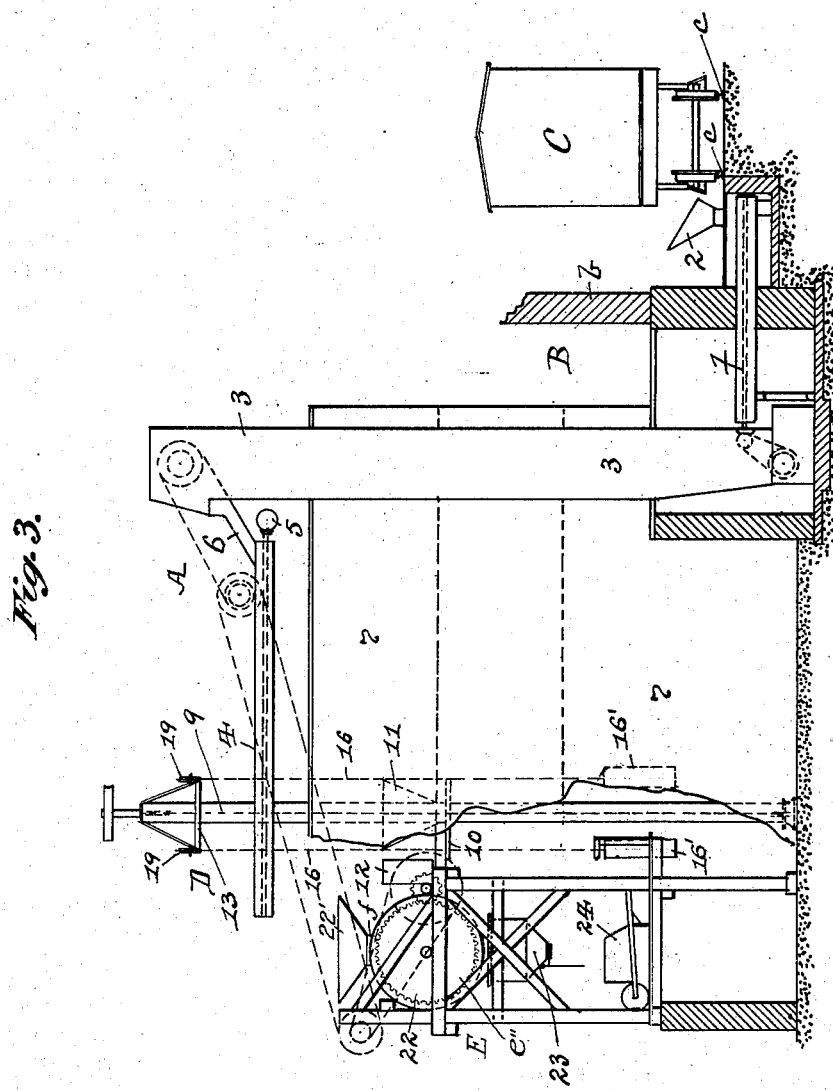

No. 741,753. Patented October 20, 1903.

UNITED STATES PATENT OFFICE.

ALFRED M. ACKLIN, OF PITTSBURG, PENNSYLVANIA, ASSIGNOR TO HEYL AND PATTERSON, OF PITTSBURG, PENNSYLVANIA, A FIRM.

HANDLING GLASS BATCH.

SPECIFICATION forming part of Letters Patent No. 741,753, dated October 20, 1903.

Application filed October 27, 1902. Serial No. 128,843. (No model.)

*To all whom it may concern:*

Be it known that I, ALFRED M. ACKLIN, a citizen of the United States of America, and a resident of Pittsburg, county of Allegheny, and State of Pennsylvania, have invented certain new and useful Improvements in Handling Glass Batch, of which the following is a specification.

My invention relates to improvements in handling glass batch, and has special reference to the handling of such batch in glass houses or factories before the final mixing of the same.

The object of my invention is to provide a rapid and convenient device for handling glass batch which will do away with a great deal of time and manual labor usually connected with the handling of the same and at the same time provide for the exact proportion of each ingredient to be used and fed or carried to be mixed.

My invention consists, generally stated, in the novel arrangement, construction, and combination of parts, as hereinafter more specifically set forth and described, and particularly pointed out in the claims.

To enable others skilled in the art to which my invention appertains to use and operate my improved plant or device for handling glass batch, I will describe the same more fully, referring to the accompanying drawings, in which—

Figure 1 is a top or plan view of my improved plant or device for handling glass batch, showing some of the parts in section and with the motor-platform removed. Fig. 2 is a side view of the same, partly broken away, and showing some of the parts in section; and Fig. 3 is an end view showing some of the parts broken away and in section.

Like symbols of reference herein indicate like parts in each of the figures of the drawings.

The apparatus, plant, or device for handling glass batch is located within a suitable building forming part of a glass-house plant, and such apparatus is shown at A, of which 1 is a power-driven conveyer which leads, preferably, through the wall $b$ of the building B, and to the same leads a hopper 2 at its outer end, into which the different materials are dumped or fed from a car C, located on the tracks $c$ adjacent to the building B. The inner end of the conveyer 1 is adapted to discharge into a power-driven elevator 3 through a chute 3', and this elevator 3 connects at its upper end with the power-driven conveyers 4 5 through a chute 6, these conveyers 4 5 being supported by the beams 4' 5', located above a series of bins 7, extending in a radius around the space or opening 8 and adapted for the storing of the different materials or ingredients to be used in making the glass batch. Within this opening 8 is the crane D, which consists of the standard or mast 9, supported at its base and top in any suitable manner, so as to rotate when desired by the application of power thereto or by hand, and upon this mast 9 and adjacent to the bottom thereof is the platform 10, which extends out therefrom toward the bins 7 and is provided with the receptacle or hopper 11 at its outer end. This hopper 11 is adapted to revolve about the same axis of the mast 9 and pass under the chutes 7', leading from the bins 7 into the opening 8, during the revolution of the mast 9 and platform 10, which chutes 7' are adapted to be opened and closed by any suitable means, and such hopper 11 is connected with a scale 12, located on said platform 10, while an escape-opening 11' is formed in said hopper 11 for the dropping or discharging of the materials therefrom, and such opening 11' is adapted to be opened and closed in any suitable manner when desired. A platform 13 is located on said mast 9 adjacent to the upper end thereof, and upon this platform 13 is the motor 14 for operating a windlass or drum 15 on said platform 13. The platform 10, carrying the hopper 11 and scale 12, is raised and lowered by ropes or chains 16 and 17, the ropes or chains 16 being connected at their lower ends to the platform 10 and on each side of the hopper 11 and scale 12, as at 18, and are adapted to pass over pulleys or sheaves 19 on the upper platform 13, as well as over the drum 15 on said platform 13, and are provided with the weights 16' for counterbalancing the weight of the platform 10, carrying the hopper 11 and scale 12. The rope or chain 17 passes around the drum 15 and around a drum or sheave 20 at the bottom of said mast 9, located below the lower platform 10. The platform 10 is connected to said rope or chain in a vertical line along the mast 9, as well as being provided with a weight 21 for counterbalancing the said platform 10, carrying the hopper 11 and scale 12.

A mixing-machine 22, mounted on a frame E, is located within the space or opening 8 and adjacent to the crane D, so that the hopper 22' on the upper end of the same will be in the path of the opening 11' in the hopper 11 as such hopper is revolved and raised on its platform 10 around the mast 9, which mixer 22 is power-operated from a drive-shaft $a$, carrying a pulley $a'$, around which passes a belt $a''$ and over a pulley $d'$, mounted on a shaft $d'$. The shaft $d'$ carries a pinion $d''$, which meshes with a gear-wheel $e$ on the main shaft $e'$, on which shaft $e'$ is mounted a mixing-cylinder $e''$, having the opening $f$ therein for registering with the opening $22''$ in the hopper 22. The machine 22 is provided with a chute 23 below the cylinder $e''$ for catching the batch dropping through the opening $f$ therein and for emptying or discharging said batch into a car or barrel 24 under the same.

The use and operation of the apparatus for handling glass batch are as follows: The radial bins 7, that are located around the space or opening 8, are designed to be filled or stored with the materials or ingredients used in making the glass batch, such as is indicated in Fig. 1. When it is desired to place any one of such materials, such as sand, in its respective bin, all that is necessary is to run the car containing said sand, such as the car C, along the track $c$ and empty the same into the hopper 2 on the outer end of the conveyer 1, and such conveyer 1 will carry said sand along the same and discharge it into the elevator 3 through the chute 3'. The elevator 3 will then lift or carry said sand up to and discharge it into the conveyer 4 through the chute 6, and such conveyor 4 will carry said sand along and discharge the same at its end or other point therein into the end radial bin 7 for such sand. The next radial bin 7 to the sand-bin for containing the salt-cake can have such ingredient fed thereto in like manner from a car C, in which case the salt-cake will be carried along by said conveyer 4 until it reaches an opening in said conveyer where it can be discharged into said bin, and such opening being arranged to be opened and closed by any suitable means when desired to permit the discharging of such salt-cake or the passing of the sand to the outer or end bin. When it is desired to convey fluor-spar to the other end bin 7, such ingredient can be fed in like manner from a car C, containing the same, to the elevator 3, through the chute 3', to the conveyer 5, and discharged through the end or other point therein into such end bin for said ingredient, and the other bins 7 for feldspar, lime, and soda can have their respective ingredients conveyed thereto in like manner through openings in said conveyer 5, which openings can be opened and closed by any suitable means when desired to permit the discharging of the particular ingredient to its respective bin. After the several radial bins 7 have had their particular ingredient placed therein, as before described, and it is desired to withdraw a portion of each ingredient from such bins, the mast 9 of the crane D is revolved so that the lower platform 10, carrying the hopper 11, comes under the chute 7' of the end bin containing the sand, when the said chute can be opened to allow a sufficient amount of said sand to be discharged from said bin into said hopper 11 and weighed by the scale 12, connected to said hopper, to ascertain the exact amount or proportion of such ingredient required. After this is accomplished the said chute is closed, and the platform 10, with its hopper 11 and scale 12, is revolved with the mast 9 of the crane D under the chute 7' of the next bin containing the salt-cake and the chute opened to allow the amount required of such ingredient to be discharged from its bin into the hopper 11, where it is weighed by the scale 12 to determine the amount required. After this is done the said chute is closed, and the platform 10, with such partly-filled hopper 11 and scale 12, is again revolved with the said mast 9 under each of the chutes of the other bins and the proportions discharged from each of said bins in like manner into the hopper 11 and weighed by the scale 12 until the said hopper is filled with the required amount of each ingredient desired for making the batch. The chute 6 may be shifted so as to deliver to either conveyer 4 or 5. The platform 10, carrying the filled hopper 11, is now ready for raising to the mixer 22, which can be accomplished by power applied to the windlass or drum 15 on the upper platform 13 from the motor 14 on said platform, which will cause the ropes or chains 16, connected to said platform 10, to be wound around said drum 15 and so raise said platform 10, carrying such filled hopper, the rope or chain 17 during this operation passing around said drum 15 and drum or sheave 20 at the bottom of said mast 9 and weights 16' and 21 on the chains 16 and 17 acting to counterbalance the platform 10 and filled hopper 11. After the platform 10 and its hopper 11 have thus reached the desired height the motor 14 is stopped, and the mast 9 of the crane D is revolved, with the platform 10 and filled hopper 11, so that such platform occupies a position over the hopper 22' of the mixer 22, when the opening 11' in said hopper 11 can be opened and the contents of the same discharged into said hopper 22' or directly into the mixer 22, where they are mixed and are discharged through the chute 23 at the bottom of said mixer into a car or barrow 24 or other receptacle, as desired, ready for use in the furnace or pot. After the hopper 11 has been emptied of its contents the opening 11' therein can be closed and the platform 10, carrying such hopper 11, revolved with the mast 9, so that it can be lowered by the ropes or chains 16 and 17, connected thereto and to the windlass or drum 15, operated from the motor 14 and counterbalanced by the weights 16' and 21 on the ropes or chains 16 and 17 in order to be ready for another operation in gathering the ingredients from the different bins.

It will be obvious that the ingredients can be changed and used in different bins from that indicated and that other ingredients can be used, if desired, in making the glass batch, while the number of bins employed can be increased or decreased, as desired, and different means or devices can be employed for carrying and feeding the different materials or ingredients to such bins as desired. It will further be obvious that the crane used can be revolved so that any one of the ingredients within such bins can be discharged into and be carried by the hopper on the lower platform of such crane and that such platform can be raised and lowered to and from the mixing-machine at various positions of the said platform in the space or opening between the radial bins. It will also be evident that my improved plant or device for handling glass batch can be employed in the handling of other materials, ingredients, &c., in the making of other batches, compositions, &c., that the various parts of the apparatus employed can be changed or altered as to form and size, and that the different steps employed can be changed or varied, while various other changes can be made in the various parts of the construction and operation of the steps and apparatus without departing from the spirit of the invention or sacrificing any of its advantages.

It will thus be seen that my improved plant or device for handling glass batch is cheap and simple in its construction and operation and by its use the different ingredients can be fed to the various bins for containing the same in a rapid and convenient manner. The ingredients can be gathered from the various bins easily and quickly in the proper proportions and discharged into the mixing-machine, so doing away with a number of men usually employed in this class of work and enabling the batch to be made in a comparatively shorter space of time than under the old methods.

What I claim as my invention, and desire to secure by Letters Patent, is—

1. A storage and mixing plant, comprising a series of bins for storing the different materials or ingredients to be used, said bins being arranged around a space or opening and provided with discharge-openings therein, and a receptacle adapted to be moved around said space to gather each ingredient therein from said bins and be raised to permit the ingredients therein to be discharged therefrom for mixing the same.

2. A storing and mixing plant, comprising a series of bins for storing the different materials or ingredients to be used, said bins being arranged radially around a space or opening and provided with discharge-openings therein, and a receptacle adapted to be moved around said space to gather each ingredient therein from said radial bins and be raised to permit the ingredients therein to be discharged therefrom for mixing the same.

3. A storage and mixing plant, comprising a series of bins for storing the different materials or ingredients to be used, said bins being arranged radially around a space or opening and provided with discharge-openings therein, a receptacle arranged to be revolved around said space to gather each ingredient therein from said bins, and a scale connected to said receptacle for weighing the ingredients discharged into said receptacle, said scale and receptacle being adapted to be raised to permit the ingredients therein to be discharged therefrom for mixing the same.

4. A storing and mixing plant, comprising a series of bins for storing the different materials or ingredients to be used, said bins being arranged radially around a space or opening and provided with discharge-openings therein, a mast or post within said space adapted to be revolved, and a receptacle connected to said mast to gather the proper proportion required of each ingredient from said radial bins and be raised on said mast to permit the ingredients therein to be discharged therefrom for mixing the same.

5. A storing and mixing plant, comprising a series of bins for storing the different materials or ingredients to be used, said bins being arranged radially around a space or opening and provided with discharge-openings therein, a mast or post within said space adapted to be revolved, a platform connected to said mast, and a receptacle on said platform for gathering the proper proportion required of each ingredient from said radial bins and be raised with said platform on the mast to permit the ingredients therein to be discharged therefrom for mixing the same.

6. A storing and mixing plant, comprising a series of bins for storing the different materials or ingredients to be used, said bins being arranged radially around a space or opening and provided with discharge-openings therein, a mast or post within said space adapted to be revolved, a platform connected to said mast, a scale on said platform for weighing said ingredients, and a receptacle on said scale for gathering each ingredient from said radial bins, and holding the same while being weighed by said scale, and a scale connected to said receptacle, said platform, receptacle and scale being adapted to be raised on the mast to permit the ingredients within said receptacle to be discharged therefrom for mixing the same.

7. A storing and mixing plant, comprising a series of bins for storing the different materials or ingredients to be used, said bins being arranged around a space or opening and provided with discharge-openings therein, a receptacle adapted to be moved around said space to gather each ingredient therein from said bins and be raised to permit the ingredients therein to be discharged therefrom for mixing the same, and means for raising and lowering said receptacle.

8. A storing and mixing plant, comprising a series of bins for storing the different materials or ingredients to be used, said bins being arranged radially around a space or opening and provided with discharge-openings therein, a receptacle adapted to be moved around said space to gather each ingredient therein from said radial bins and be raised to permit the ingredients therein to be discharged therefrom for mixing the same, and means for raising and lowering said receptacle.

9. A storing or mixing plant, comprising a series of bins for storing the different materials or ingredients to be used, said bins being arranged radially around a space or opening and provided with discharge-openings therein, a mast or post within said space adapted to be revolved, a receptacle connected to said mast to gather the proper proportion required of each ingredient from said radial bins and be raised on said mast to permit the ingredients therein to be discharged therefrom for mixing the same, and means on said mast for raising and lowering said receptacle.

10. A storing and mixing plant, comprising a series of bins for storing the different materials or ingredients to be used, said bins being arranged radially around a space or opening and provided with discharge-openings therein, a mast or post within said space adapted to be revolved, a platform connected to said mast, a receptacle on said platform for gathering the proper proportion required of each ingredient from said radial bins and be raised with said platform on the mast to permit the ingredients therein to be discharged therefrom for mixing the same, and means on said mast for raising and lowering said receptacle.

11. A storing and mixing plant, comprising a series of bins for storing the different materials or ingredients to be used, said bins being arranged radially around a space or opening and provided with discharge-openings therein, a mast or post within said space adapted to be revolved, a platform connected to said mast, a scale on said platform for weighing said ingredients, and a receptacle on said scale for gathering each ingredient from said radial bins and holding the same while being weighed by said scale, said platform, receptacle and scale being adapted to be raised on the mast to permit the ingredients within said receptacle to be discharged therefrom for mixing the same, and means on said mast for raising and lowering said receptacle.

12. A storing and mixing plant, comprising a series of bins for storing the different materials or ingredients to be used, said bins being arranged around a space or opening and provided with discharge-openings therein, a receptacle adapted to be moved around said space to gather each ingredient therein from said bins and be raised to permit the ingredients therein to be discharged therefrom for mixing the same, and power-driven ropes or chains connected to said receptacle for raising and lowering the same.

13. A storing and mixing plant, comprising a series of bins for storing the different materials or ingredients to be used, said bins being arranged radially around a space or opening and provided with discharge-openings therein, a receptacle adapted to be moved around said space to gather each ingredient therein from said radial bins and be raised to permit the ingredients therein to be discharged therefrom for mixing the same, and power-driven ropes or chains connected to said receptacle for raising and lowering the same.

14. A storage and mixing plant, comprising a series of bins for storing the different materials or ingredients to be used, said bins being arranged radially around a space or opening and provided with discharge-openings therein, a receptacle arranged to revolve around said space to gather each ingredient therein from said bins, a platform and a scale thereon connected to said receptacle for weighing the ingredients discharged into said receptacle, said scale and receptacle being adapted to be raised to permit the ingredients therein to be discharged therefrom for mixing the same, and power-driven ropes and chains connected to said platform for raising and lowering the same.

15. A storing and mixing plant, comprising a series of bins for storing the different materials and ingredients to be used, said bins being arranged radially around a space or opening and provided with discharge-openings therein, a mast or post within said space adapted to be revolved, a receptacle connected to said mast to gather the proper proportion required of each ingredient from said radial bins and be raised on said mast to permit the ingredients therein to be discharged therefrom for mixing the same, and power-driven ropes or chains on said mast and connected to said receptacle for raising and lowering the same.

16. A storing and mixing plant, comprising a series of bins for storing the different materials or ingredients to be used, said bins being arranged radially around a space or opening and provided with discharge-openings therein, a mast or post within said space adapted to be revolved, a platform connected to said mast, a receptacle on said platform for gathering the proper proportion required of each ingredient from said radial bins and be raised with said platform on the mast to permit the ingredients therein to be discharged therefrom for mixing the same, and power-driven ropes or chains on said mast and connected to said platform for raising and lowering said receptacle.

17. A storing and mixing plant, comprising a series of bins for storing the different materials or ingredients to be used, said bins being arranged radially around a space or opening and provided with discharge-openings therein, a mast or post within said space adapted to be revolved, a platform connected to said mast, a scale on said platform for weighing said ingredients, and a receptacle on said scale for gathering each ingredient from said radial bins and holding the same while being weighed by said scale, said platform, receptacle and scale being adapted to be raised on the mast to permit the ingredients within said receptacle to be discharged therefrom for mixing the same, and power-driven ropes or chains on said mast and connected to said platform for raising and lowering the same.

Signed at Pittsburg this 15th day of October, 1902.

ALFRED M. ACKLIN.

Witnesses:
J. N. COOKE,
L. T. MARKS.